United States Patent
Munteanu et al.

(10) Patent No.: US 7,505,863 B2
(45) Date of Patent: Mar. 17, 2009

(54) INTERFEROMETRIC ITERATIVE TECHNIQUE WITH BANDWIDTH AND NUMERICAL-APERTURE DEPENDENCY

(75) Inventors: Florin Munteanu, Tucson, AZ (US); Joanna Schmit, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 0 days.

(21) Appl. No.: 11/827,737

(22) Filed: Jul. 13, 2007

(65) Prior Publication Data

US 2009/0018786 A1  Jan. 15, 2009

(51) Int. Cl.
*G06F 3/00* (2006.01)
(52) U.S. Cl. ............... 702/127; 702/150; 702/155; 702/159
(58) Field of Classification Search ........... 702/76, 702/77, 97, 127, 150, 152, 189, 155, 159; 356/497, 511; 359/1; 382/106
See application file for complete search history.

(56) References Cited

U.S. PATENT DOCUMENTS

| | | | |
|---|---|---|---|
| 6,351,307 B1 * | 2/2002 | Erskine | 356/451 |
| 7,324,210 B2 * | 1/2008 | De Groot et al. | 356/497 |
| 7,324,214 B2 * | 1/2008 | De Groot et al. | 356/511 |

OTHER PUBLICATIONS

H.Y. Yun et al., "Interframe Intensity correlation for sel-calibration in Phase Shifting Interferometry," Applied Optics, vol. 44, No. 23, Aug. 2005, p. 4860.
G. Lai et al., "Generalized Phase-Shifting Interferometry," J. Opt. Soc Am. A, vol. 8, No. 5, May 1991, p. 822.
K. Okada et al., "Simultaneous Calculation of Phase Distribution and Scanning Phase Shift in Phase Shifting . . . ," Optics Communications, vol. 84, Nos. 3-4, Jul. 1991, p. 118.
C. Wei et al. "General Phase-Stepping Algorithm with Automatic Calibration of Phase Stepd," Opt. Eng. 38(8), Aug. 1999, pp. 1357-1360.
R. Onodera et al., "Phase-Extraction Analysis of Laser-Diode Phase-Shifting Interferometry that is Insensitive to . . . ," J. Opt. Soc Am. A, vol. 13, No. 1, Jan. 1996, p. 139.
X. Chen et al., "Phase-Shifting Interferometry with Uncalibrated Phase Shifts," Applied Optics, vol. 39, No. 4, Feb. 2000, p. 585.
H. Guoi et al., "Least-Squares Algorithm for Phase-Stepping Interferometry with an Unknown Relative Step," Applied Optics, vol. 44, No. 23, Aug. 2005, p. 4854.
I. Kong et al., "General Algorithm of Phase-Shifting Interferometry by Iterative Least-Squares Fitting," Optical Engineering, vol. 34, No. 1, Jan. 1995, p. 183.
A. Dubois et al. , "Phase Measurements with Wide-Aperture Interferometers", Applied Optics, May 2000, p. 2326.

* cited by examiner

*Primary Examiner*—Drew A Dunn
*Assistant Examiner*—Felix E Suarez
(74) *Attorney, Agent, or Firm*—Antonio R. Durando (57) ABSTRACT

An interferometric intensity equation includes parameters that depend on bandwidth and numerical aperture. An error function based on the difference between actual intensities produced by interferometry and the intensities predicted by the equation is minimized iteratively with respect to the parameters. The scan positions (i.e., the step sizes between frames) that minimized the error function are then used to calculate the phase for each pixel, from which the height can also be calculated in conventional manner. As a result, the phase map generated by the procedure is corrected to a degree of precision significantly better than previously possible.

36 Claims, 6 Drawing Sheets

INTERFEROMETRIC ITERATIVE TECHNIQUE WITH BANDWIDTH AND NUMERICAL-APERTURE DEPENDENCY

BACKGROUND OF THE INVENTION

1. Field of the Invention

This invention relates in general to the field of scanning interferometry and, in particular, to a new technique for improving the accuracy of iterative algorithms for interferometric measurements carried out on an interference microscope with modulation variations of the interference signal due to narrowband wavelengths and/or relatively high numerical apertures in addition to the presence of vibrations.

2. Description of the Prior Art

Many algorithms have been developed in the art for calculating surface topography from optical interference data recovered from conventional scanning techniques. In particular, phase-shifting interferometry (PSI) and related techniques are based on changing the phase difference between two coherent interfering beams using a single wavelength $\lambda$ (ideally) and an optical system with zero numerical-aperture in some known manner, for example by changing the optical path difference (OPD) either continuously or discretely with time. Several measurements of light intensity with different OPD values, usually equally spaced, at a pixel of a photodetector can be used to determine the phase difference between the interfering beams at the point on a test surface corresponding to that pixel. Based on such measurements at all pixels with coordinates (x,y), a phase map $\Phi(x,y)$ of the test surface can be obtained, from which very accurate data about the surface profile may be calculated using well known algorithms. (For convenience, the term "pixel" is used hereinafter to refer both to a detector pixel and to the corresponding region of the sample surface. Also, the term "narrowband" is used exclusively to refer to a light with a spectral bandwidth, as opposed to a theoretically precise, single-wavelength source.)

Several factors, all well understood in the art, affect the quality of PSI interferometric measurements. For example, a fixed scanning step size between acquisition frames is generally assumed for all algorithms, but any factor that causes a change in step size (such as equipment vibrations, scanner nonlinearities, air turbulence, or wavelength variations in the case of wavelength scanning) can affect the performance of the algorithm and produce a non-uniform profile even when the sample surface is perfectly flat. Single-wavelength illumination and zero numerical aperture are also assumed for all algorithms, but not actually used in practice.

PSI corrects fairly well for miscalibrations and slow changes in step size, but it is ineffective for random changes in step size. Thus, algorithms based on an iterative approach have been developed to ameliorate this problem. See, for example, G. Lai et al., "Generalized Phase-Shifting Interferometry," J. Opt. Soc Am. A, Vol. 8, No. 5, May 1991, p. 822; K. Okada et al., "Simultaneous Calculation of Phase Distribution and Scanning Phase Shift in Phase Shifting Interferometry," Optics Communications, Vol. 84, Nos. 3-4, July 1991, p. 118; C. Wei et al. "General Phase-Stepping Algorithm with Automatic Calibration of Phase Step," Opt. Eng. 38(8), August 1999, pp. 1357-1360; R. Onodera et al., "Phase-Extraction Analysis of Laser-Diode Phase-Shifting Interferometry that is Insensitive to Changes in Laser Power," J. Opt. Soc Am. A, Vol. 13, No. 1, January 1996, p. 139; X. Chen et al., "Phase-Shifting Interferometry with Uncalibrated Phase Shifts," Applied Optics, Vol. 39, No. 4, February 2000, p. 585; H. Guo et al., "Least-Squares Algorithm for Phase-Stepping Interferometry with an Unknown Relative Step," Applied Optics, Vol. 44, No. 23, August 2005, p. 4854; H. Y. Yun et al., "Interframe Intensity Correlation Matrix for Self-Calibration in Phase-Shifting Interferometry," Applied Optics, Vol. 44, No. 23, August 2005, p. 4860; I. Kong et al., "General Algorithm of Phase-Shifting Interferometry by Iterative Least-Squares Fitting," Optical Engineering, Vol. 34, No. 1, January 1995, p. 183. In essence, all of these techniques involve a process whereby the result produced by the algorithm is refined by iteratively calculating improved step sizes, and correspondingly improved phases, that conform to the actual modulation data produced by the interferometric measurement. These iterative techniques typically find the phase and step size values that minimize an error function based on the difference between measured and theoretical intensity, the latter being calculated on the basis of equations with parameters expressed in function of x,y (sample pixel position) and z (vertical scan position).

Figure 1A:
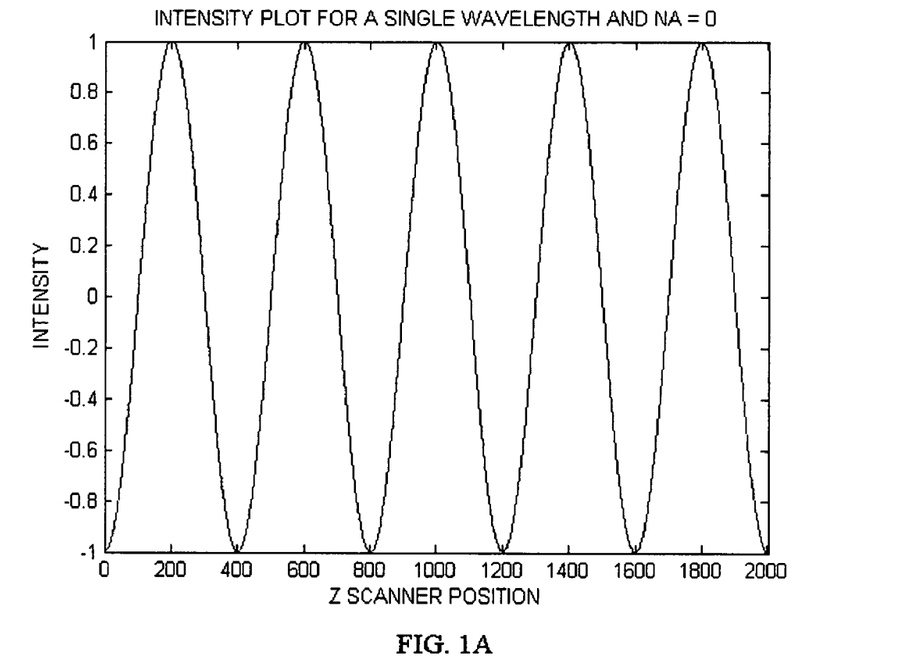
FIG. 1A illustrates the plot of intensity versus scanning height registered at a pixel of an interferometer's detector when a single-wavelength light source is used to illuminate the sample with zero numerical aperture and no environmental perturbations (such as variable scanning steps, vibrations, and air turbulence).
Figure 1B:
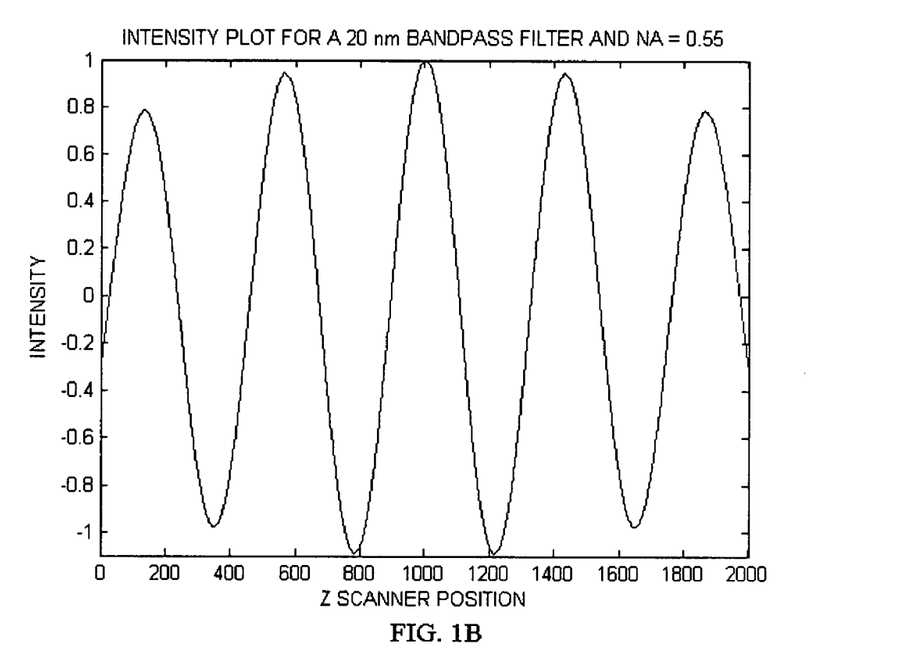
FIG. 1B shows the modulation effect produced by a narrow-band light source and non-zero numerical aperture on the intensity plot of FIG. 1.

All algorithms assume that the amplitude of modulation remains constant during the scan, but in fact that is almost never the case. In practice, the light intensity detected as a result of interference of the test and reference beams, which would be perfectly sinusoidal under ideal single-wavelength and zero-numerical-aperture conditions, exhibits a modulation variation that affects the interferometric result. FIGS. 1A and 1B illustrate this undesirable condition as might be seen at each pixel of the interferometer's detector. Thus, the effectiveness of the algorithm tends to decrease with increased spectral bandwidth of the source and also with increased numerical aperture of the objective used for the measurement.

In practice, a narrowband source (such as a laser) or a filtered broadband light is used instead of an ideal single-wavelength source to carry out the interferometric measurement, thereby affecting the amplitude of modulation of the interference signal and the performance of the algorithm. All systems also utilize a non-zero numerical aperture, which similarly affects the amplitude of modulation of the interference signal. Therefore, the effectiveness of all prior art algorithms tends to be undermined by the practical conditions under which they are normally implemented. PSI algorithms, which are designed to tolerate fairly well miscalibrated or slow changes in step size, tend to tolerate fairly well also variations of modulation in the interference signal caused by bandwidth and numerical aperture. However, they are very intolerant of random steps in the optical path of the interferometer due to mechanical vibration. (Mechanical vibrations are especially common when interference microscopes are employed in manufacturing environments.) The iterative techniques, on the other hand, are tolerant of random steps, but are very intolerant of variations in modulation of the interference signal.

In practice, all iterative algorithms used in the art neglect the effect that numerical apertures (in the order of 0.13 and greater) combined with narrowband wavelengths (in the order of 5 nm and greater, rather than single) have on the amplitude of the interference signal. Theoretically, an iterative procedure applied to a system with zero numerical aperture could produce reliable results with illumination of up to about 5-nm spectral bandwidth, and a system with single wavelength could produce reliable results with numerical apertures up to about 0.33. However, practical combinations of bandwidth and numerical aperture will produce a significant variation in the modulation amplitude of the interference signal. Thus, it would be very desirable to have an interferometric processing algorithm that accounted for the bandwidth of the light source and the numerical aperture that are actually used in interferometry. The present invention is directed at improving the prior art by introducing new parameters to reflect the effects of bandwidth and non-zero numerical aperture in the theoretical equations used to process the interferometric data.

The following derivation illustrates in detail the general approach used in the art to formulate the theoretical relationship between phase, scanning position and the intensity measured by the detector at each pixel as a result of an interferometric measurement. In addition, according to the invention, the approach is expanded to account for the effects of narrow-band light and non-zero numerical aperture. While believed to be novel, this derivation is presented in the background section of this disclosure, rather than in the detailed description, in order to provide a foundation upon which the prior art as well as the present invention may be described. Though one skilled in the art will readily understand that the derivation is not unique, it is representative of the general theoretical equations that can be developed for the relationship between light intensity, phase, scanning position, numerical aperture and bandwidth.

The following general equation is generally used to represent the relationship between the intensity I of a light source of wavelength $\lambda_0$ measured at each pixel and the scanning position $z_k$ at each acquisition frame k:

$$I(x, y, z_k, \lambda_0) = B + M\cos\left(\frac{4\pi}{\lambda_0}(h^0_{obj} - h^0_{ref} - z_k)\right), \quad (1)$$

where I is a function of surface position x,y, scanning position $z_k$, and wavelength $\lambda_0$; $h_{obj}^0$ and $h_{ref}^0$ are the height positions of the object and reference surfaces, respectively, at the beginning of the scan; and B and M are background and modulation amplitude parameters, functions of x, y, $z_k$ and $\lambda_0$. Note that $z_k$ is also a measure of the optical path difference between the reference and test beams of the interferometer. Therefore, while $z_k$ is used for convenience throughout this disclosure, it is intended also to refer more generally to OPD in any interferometric system, such as ones where interference is produced without an actual scan of the object surface. For the sake of precision, note also that the term I of Equation 1 expresses irradiance, rather than intensity, but intensity is normally used in the art to refer to both; therefore, intensity will be used throughout the description of the invention. Assuming that a fixed, single wavelength $\lambda_0$ is used to perform phase-shifting interferometry, Equation 1 may be simplified by removing the explicit dependence on wavelength, which yields $$I(x, y, z_k) = B(x, y, z_k) + M(x, y, z_k)\cos\left(\frac{4\pi}{\lambda_0}(h^0_{obj} - h^0_{ref} - z_k)\right) \quad (2)$$

Figure 2:
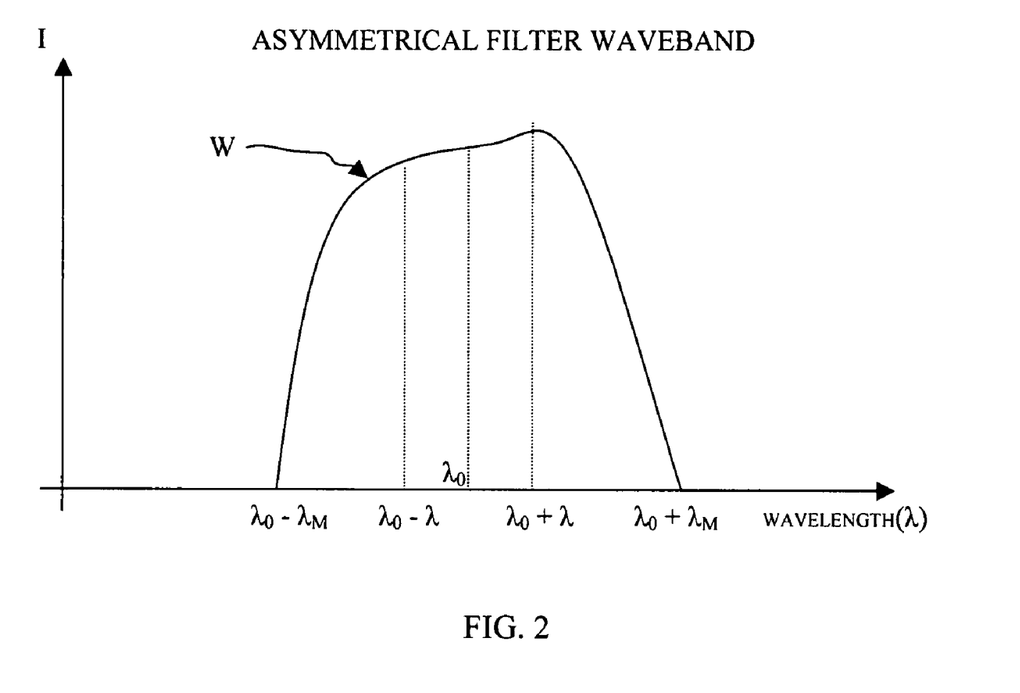
FIG. 2 is an illustration of the spectral distribution of a typical narrow-band light source used in phase-shifting interferometry.

In practice the wavelength of the illumination source is known to span over some narrow band centered around $\lambda_0$, such as illustrated in FIG. 2. Assuming such an asymmetrical illuminating spectrum of bandwidth W spanning from ($\lambda_0 - \lambda_M$) to ($\lambda_0 + \lambda_M$) around the center wavelength $\lambda_0$, the sum of the contribution from each wavelength equidistant from $\lambda_0$ can be written (from Equation 2) as follows:

$$I(x, y, z_k, \lambda) = \quad (3)$$
$$B + M\cos\left(\frac{4\pi}{\lambda_0 - \lambda}(h^0_{obj} - h^0_{ref} - z_k)\right) + N\cos\left(\frac{4\pi}{\lambda_0 + \lambda}(h^0_{obj} - h^0_{ref} - z_k)\right)$$

where $\lambda$ is the distance of each wavelength from $\lambda_0$ (i.e., referring to FIG. 2, the two wavelengths at $\lambda_0 - \lambda$ and $\lambda_0 + \lambda$), $B=B(x,y,z_k,\lambda)$, $M=M(x,y,z_k,\lambda)$, $N=N(x,y,z_k,\lambda)$, $|\lambda| \leq \lambda_M$, B is background, and M and N represent signal modulation for the wavelengths $\lambda_0 - \lambda$ and $\lambda_0 + \lambda$ on each side of the center wavelength $\lambda_0$.

Equation 3 may be simplified by normalizing its terms by defining $$h \equiv \frac{\lambda}{\lambda_0}, \quad h_M \equiv \frac{\lambda_M}{\lambda_0}, \quad \varphi \equiv \varphi(x, y) \equiv \frac{4\pi}{\lambda_0}(h^0_{obj} - h^0_{ref}), \text{ and } t_k \equiv \frac{4\pi}{\lambda_0}z_k.$$

For the case where $$0 \leq \frac{\lambda}{\lambda_0} \leq \frac{\lambda_M}{\lambda_0} = h_M \leq 0.1$$

(such as when a 70 nm bandwidth filter is used centered on 700 nm—note that in the art filter bandwidth refers to its width around the center wavelength, i.e., $\lambda_0 - \lambda_M$), the equation can be further simplified by using the first order Taylor expansion of the quantities $1/(\lambda_0 - \lambda)$ and $1/(\lambda_0 + \lambda)$, that is $$\frac{1}{\lambda_0 - \lambda} \cong \frac{1}{\lambda_0}\left(1 + \frac{\lambda}{\lambda_0}\right) = \frac{1}{\lambda_0}(1 + h) \frac{1}{\lambda_0 + \lambda} \cong \frac{1}{\lambda_0}\left(1 - \frac{\lambda}{\lambda_0}\right) = \frac{1}{\lambda_0}(1 - h).$$

Straightforward substitution yields the equation $$I(x,y,t_k,\lambda_0,h)=B+M\cos[(\varphi-t_k)(1+h)]+N\cos[(\varphi-t_k)(1-h)], \quad (4)$$

which can be further simplified, applying the general trigonometric identity $\cos(a \pm b)=\cos(a)\cos(b)\mp\sin(a)\sin(b)$, as follows $$I(x,y,t_k,\lambda_0,h)=B-\{(M-N)\sin[h(\varphi-t_k)]\}\sin(\varphi-t_k)+\{(M+N)\cos[h(\varphi-t_k)]\}\cos(\varphi-t_k). \quad (5)$$

Note that Equation 5 reflects an intensity dependency on x, y and $z_k$ (through $t_k$), as well as on wavelength spectrum (through h).

Integration of Equation 5 over h from 0 to $h_M$ (i.e., integrating the intensity equation over all wavelengths within the spectrum W of FIG. 2), leads to the equation $$I(x, y, t_k, \lambda_0) = \quad (6)$$
$$B + [h_M(M^{eff} - N^{eff})]\frac{\cos[h_M(\varphi - t_k)] - 1}{h_M(\varphi - t_k)}\sin(\varphi - t_k) + [h_M(M^{eff} + N^{eff})]\frac{\sin[h_M(\varphi - t_k)]}{h_m(\varphi - t_k)}\cos(\varphi - t_k)$$

where $B=B(x,y,t_k)$ now denotes a constant of integration with respect to $\lambda$, and $M^{eff}=M^{eff}(x,y,t_k)$ and $N^{eff}=N^{eff}(x,y,t_k)$ are effective mean values of $M(x,y,t_k,\lambda)$ and $N(x,y,t_k,\lambda)$ respectively, over the entire $\lambda$ domain. Further, for a given $\lambda_0$, by substituting according to the following definitions, $$P \equiv P(x, y, t_k, \lambda_0) \equiv [h_M(M^{eff} - N^{eff})]\frac{\cos[h_M(\varphi - t_k)] - 1}{h_M(\varphi - t_k)}, \text{ and} \quad (7a)$$

-continued $$Q \equiv Q(x, y, t_k, \lambda_0) \equiv [h_M(M^{eff} + N^{eff})]\frac{\sin[h_M(\varphi - t_k)] - 1}{h_M(\varphi - t_k)}, \quad (7b)$$

it is possible to write Equation 6 in much simpler form as $$I(x,y,t_k) = B + P\sin(\phi - t_k) + Q\cos(\phi - t_k). \quad (8)$$

The two parameters P and Q reflect the general asymmetry in the spectrum of narrowband light. If the spectrum were symmetrical, a single parameter would suffice.

Finally, applying the same trigonometric identity mentioned above [i.e., $\cos(a \pm b) = \cos(a)\cos(b) \mp \sin(a)\sin(b)$], as well as $\sin(a \pm b) = \sin(a)\cos(b) \pm \cos(a)\sin(b)$, Equation 8 can be written to yield $$I(x,y,t_k) = B + [Q\cos(\phi) + P\sin(\phi)]\cos(t_k) + [Q\sin(\phi) - P\cos(\phi)]\sin(t_k), \quad (9)$$

thereby separating the dependence on $\phi$ from the dependence on $t_k$. Of course, the coefficients "P" and "Q" will still be dependent on both $\phi$ and $t_k$ and this dependence will not be separable in general. Equation 9 is a theoretical expression of intensity measured at a given pixel x,y as a function of initial phase $\phi$ and scanning position $t_k$, wherein the narrowband nature of the light source (rather than single wavelength) is accounted for by the parameters B, P, and Q. These parameters remain dependent on x,y, $t_k$ and $\lambda_0$.

The overall effect of numerical aperture ($NA = \sin(\Theta_{Max}) \geq 0$) on the measured intensity was estimated by A. Dubois et al. in "Phase Measurements with Wide-Aperture Interferometers," *Applied Optics*, May 2000, page 2326. For cases where NA is small (i.e., $\cos\Theta_{Max} \cong 1$), these authors determined that the effect of numerical aperture on light intensity can be accounted for by a coefficient equal to $\sin(\beta*t_k)/(\beta*t_k)$, where $\beta = [1 - \cos(\Theta_{Max})]/2$. Thus, Equation 9 can be further modified to account for numerical aperture as follows:

$$I_{NA}(x, y, t_k) = \quad (10)$$
$$\{B + [Q\cos(\varphi) + P\sin(\varphi)]\cos(t_k) + [Q\sin(\varphi) - P\cos(\varphi)]\sin(t_k)\} * \frac{\sin(\beta*t_k)}{\beta*t_k},$$

wherein the star symbol is used to denote multiplication and $I_{NA}$ is intensity corrected for the effect of an approximately paraxial aperture (the normal condition for interferometric measurements).

Equation 10 may be simplified by defining $$B_{NA} \equiv B\frac{\sin(\beta*t_k)}{\beta*t_k} = B_{NA}(x, y, t_k, \lambda_0), \quad (11a)$$

$$Q_{NA} \equiv Q\frac{\sin(\beta*t_k)}{\beta*t_k} = [h_M(M^{eff} + N^{eff})]\frac{\sin[h_M(\varphi - t_k)]}{h_M(\varphi - t_k)}\frac{\sin(\beta*t_k)}{\beta*t_k} = \quad (11b)$$
$$Q_{NA}(x, y, t_k, \lambda_0), \text{ and}$$

$$P_{NA} \equiv P\frac{\sin(\beta*t_k)}{\beta*t_k} = [h_M(M^{eff} - N^{eff})]\frac{\cos[h_M(\varphi - t_k)] - 1}{h_M(\varphi - t_k)}\frac{\sin(\beta*t_k)}{\beta*t_k} = P_{NA}(x, y, t_k, \lambda_0), \quad (11c)$$

where the subscript NA is used to indicate the numerical-aperture dependence of the parameter. Substituting from these definitions, Equation 10 becomes $$I_{NA}(x,y,t_k) = B_{NA} + [Q_{NA}\cos(\phi) + P_{NA}\sin(\phi)]\cos(t_k) + [Q_{NA}\sin(\phi) - P_{NA}\cos(\phi)]\sin(t_k). \quad (12)$$

Note that Equation 12 also expresses theoretical intensity from a narrow-band light centered around $\lambda_0$ measured at a given pixel x,y as a function of phase $\phi$ and scanning position $t_k$, but now both the narrowband nature of the light source and numerical aperture are accounted for through the parameters $B_{NA}$, $P_{NA}$ and $Q_{NA}$. For a given $\lambda_0$, these parameters still remain dependent on x,y and $t_k$.

The equation generally used in the art to calculate intensity has the form $$I(x,y,t_k) = A(x,y,t_k) + V(x,y,t_k)*\cos(\phi - t_k), \quad (13)$$

and the functionality of "A" and "V" has been assumed separable, that is, $A(x,y,t_k) = A_1(x,y)A_2(t_k)$ and $V(x,y,t_k) = V_1(x,y)V_2(t_k)$. If no symmetry around the center wavelength $\lambda_0$ is assumed to be present in the spectrum of the light used to carry out the interferometric measurement, the term $P_{NA}$ in Equation 12 derived above is zero (because $M^{eff} = N^{eff}$) and the equation reduces to:

$$I_{NA}(x,y,t_k) = B_{NA} + [Q_{NA}\cos(\phi)]\cos(t_k) + [Q_{NA}\sin(\phi)]\sin(t_k), \quad (14)$$

Again, through trigonometric identity, this equation can be written as $$I_{NA}(x,y,t_k) = B_{NA} + Q_{NA}\cos(\phi - t_k), \quad (15)$$

which is identical in form to the conventional relation of Equation 13, except that the parameters $B_{NA}$ and $Q_{NA}$ have been derived so as to implicitly reflect spectral and numerical-aperture functionality. For the general case, the dependencies of $Q_{NA}$ on $\phi$ and $t_k$ will no be separable. Because of this identity of forms, Equations 12, 14 and 15 will be used herein for consistency of notation, instead of Equation 13, first to explain the conventional approach to correcting height for errors introduced by nonlinearities and environmental perturbations. Then, the same equations will be used to explain the present invention and its novel features that distinguish it from all techniques heretofore used in the art.

Thus, referring to Equation 14, the conventional prior-art approach would involve separating the dependence of the terms over x,y from the dependence over $t_k$ [that is, writing $B_{NA}(x,y,t_k) = B_1(x,y)B_2(t_k)$ and $Q_{NA}(x,y,t_k) = Q_1(x,y)Q_2(t_k)$], so that the equation could be written as:

$$I(x,y,t_k) = B_1(x,y)B_2(t_k) + Q_1(x,y)Q_2(t_k)\cos(\phi)\cos(t_k) + Q_1(x,y)Q_2(t_k)\sin(\phi)\sin(t_k). \quad (16)$$

This relation can be simplified by defining the quantities ti $C = C(x,y) \equiv Q_1(x,y)\cos[\phi(x,y)]$ $S = S(x,y) \equiv Q_1(x,y)\sin[\phi(x,y)]$ $\text{Cos}(t_k) = \text{Cos}[t_k(t_k)] \equiv Q_2(t_k)\cos(t_k)$ $\text{Sin}(t_k) = \text{Sin}[t_k(t_k)] \equiv Q_2(t_k)\sin(t_k)$ such that Equation 16 can be written as $$I(x,y,t_k) = B_1(x,y)B_2(t_k) + C(x,y)*\text{Cos}(t_k) + S(x,y)*\text{Sin}(t_k). \quad (17)$$

In this equation the explicit dependence on $\phi$ of Equation 16 is removed and retained only implicitly in the substituted parameters C and S. Equation 17 is then used globally (i.e., over x, y and $t_k$) to find iteratively the best sets of parameters $[B_1, B_2, C, S, \cos(t_k), \sin(t_k)]$, and correspondingly the best sets of step sizes and phases, that match the modulation data registered during the interferometric scan.

To that end, an error function T is defined as the difference between the recorded values of intensity and the values predicted by Equation 17. Using a conventional least-squares approach, the error function may be defined as:

$$T(x, y, t_k) \equiv \sum_x \sum_y \sum_k [I(x, y, t_k) - B_1(x, y)B_2(t_k) - C(x, y) * \quad (18)$$
$$\cos(t_k) - S(x, y) * \sin(t_k)]^2.$$

Using Equation 18, the set of coordinates $[B_1, C, S]$ and $[B_2, \cos(t_k), \sin(t_k)]$ that minimize the error function T is determined iteratively in conventional manner by the following procedure, which is well documented in the literature.

Step A. The procedure is started with a guess solution $[B_2^0, \cos(t_k^0), \sin(t_k^0)]$. The best set $[B_1^i, C^i, S^i]$ is found that minimizes the error function T (where the superscript "i" is used to denote the iteration number and i=1 in the first instance). This may be done in conventional manner by equating partial derivatives of T to zero and solving for the respective parameters. That is, each of the following identities is solved for its respective unknown variable, $B_1^i$, $C^i$, and $S^i$:

$$\frac{\partial T}{\partial B_1} = \frac{\partial T}{\partial C} = \frac{\partial T}{\partial S} = 0. \quad (19)$$

Step B. Using the newly determined values for $[B_1^i, C^i, S^i]$, the error function T is updated. Then, a set $[B_2^i, \cos(t_k^i), \sin(t_k^i)]$ that minimizes the error function is similarly determined. This may be done again by solving the partial derivative equations $$\frac{\partial T}{\partial B_2} = \frac{\partial T}{\partial \cos(t_k)} = \frac{\partial T}{\partial \sin(t_k)} = 0. \quad (20)$$

Step C. Next, the step size $t_k^i$ (i.e., the frame separation during the scan) is estimated from the usual relation $$t_k^i = \arctan\left(\frac{\sin(t_k)^i}{\cos(t_k)^i}\right), \quad (21)$$

and $t_k^i$ is compared to the value obtained in the previous step. Initially, it is compared to the scanner's design step size, which will also be the step size for the interferometric algorithm in use (typically $\pi/2$). If the difference is less than a predetermined limit, the iteration process is stopped. Otherwise, the process is repeated from Step A, wherein the values of $[B_2^{i+1}, \cos(t_k^{i+1}), \sin(t_k^{i+1})]$ are updated using the previous solution $[B_2^i, \cos(t_k^i), \sin(t_k^i)]$.

Step D. When the iterative process is stopped as described above, the phase (and correspondingly the height) is calculated for each pixel x,y in conventional manner using the equation $$\varphi = \arctan\left[\frac{\sin\varphi}{\cos\varphi}\right] = \arctan\left(\frac{S^i}{C^i}\right), \quad (22)$$

where i corresponds to the last step of iteration.

The conventional technique described above produces good results for narrowband light that approaches single wavelength illumination and for objectives without low numerical aperture. As the spectral band of the light source and/or the numerical aperture increase, the performance of the techniques currently in use deteriorates rapidly and the results are no longer reliable. For example, spectral bands in the order of 5 nm or greater produce a significant amount of modulation variation in the intensity data, which in turn causes erroneous height calculations. (Note that modulation variation is also commonly referred to as amplitude modulated sinusoidal signal in optics and electrical engineering.) Similar results are produced when numerical apertures greater than about 0.33 are used. Therefore, any procedure that allowed correction when narrowband light and/or significant numerical aperture are used would constitute a very useful advance in the art.

BRIEF SUMMARY OF THE INVENTION

The heart of the invention is in the idea of employing an equation, preferably based on theoretical considerations, that expresses the intensity measured at each pixel during an interferometric scan as a function of scan position, initial phase map, and a set of parameters that depend on the bandwidth and the numerical aperture of the system used to acquire the interferometric data. Such an equation is used to establish a global error function that can thus be minimized for all data with respect to the best parameters that produce a calculated modulation that most closely approximates the interferometric data. Once these parameters are found, the scan positions (i.e., the step sizes between frames) that produced such best approximation are used to calculate the phase for each pixel, from which the height can also be calculated in conventional manner. The measurement corrections enabled by this process can substantially reduce the impact of mechanical vibrations, scanner nonlinearities, air turbulence, or wavelength variations that can otherwise afflict the measurements of interference microscopes.

The preferred error function is a least-squares representation of the difference between the actual intensities produced by the interferometric measurement and the intensities predicted by the theoretical equation. According to one aspect to the invention, the error function minimization is carried out iteratively by minimizing sequentially with respect to two subsets of parameters, wherein at each iteration the values produced by the previous iteration for the first subset are used to calculate the second subset, and then the new values for the second subset are used to update the first subset. The iterative process is continued until the error function is minimized to within a predetermined value deemed acceptable.

The iteration process may be simplified by introducing a transform whereby two of the parameters in the equation expressing intensity according to the invention are normalized. As a result, the phase map generated by the procedure of the invention is corrected to a degree of precision significantly better than previously possible.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

One aspect of the invention lies in the addition of bandwidth and numerical-aperture dependence in the parameters of the equations used to express the theoretical intensity produced by interference. According to another aspect, the invention introduces an additional and new step in the numerical procedure followed to solve for the parameters that produce near identity between the theoretical and the actual values of intensity recorded during the interferometric scan. As a result, the numerical procedure of the invention corrects interferometric data for scanner nonlinearities and environmental perturbations, as well as for errors caused by narrowband light and significant numerical aperture.

As used herein, the term "global," when used with reference to a set of variables, is intended to refer to all data points acquired over the space spanned by the set of variables. For instance, minimization of a global error function wherein x, y and z are variables is intended to refer to a minimization with respect to given parameter over all data acquired in x, y and z space.

Referring back to Equation 12, it may be simplified by defining and substituting the following quantities:

$$U(x,y,t_k) = Q_{NA}\cos(\phi) + P_{NA}\sin(\phi) \text{ and} \tag{23a}$$

$$V(x,y,t_k) = Q_{NA}\sin(\phi) - P_{NA}\cos(\phi), \tag{23b}$$

where U and V depend upon x, y and $t_k$. This substitution removes the explicit dependence of U and V on $\phi$, which is instead only implicitly present in the parameters. In order to further separate the dependence of U and V from x,y from their dependence from $t_k$, these parameters are then expressed in the following manner:

$$U(x,y,t_k) = U_1(x,y)*U_2(t_k)*f_c(x,y,t_k) \tag{24a}$$

$$V(x,y,t_k) = V_1(x,y)*V_2(t_k)*f_s(x,y,t_k) \tag{24b}$$

where the new factors $f_c(x,y,t_k)$ and $f_s(x,y,t_k)$ represent coefficients correlating the inseparable dependency of U and V from x,y and $t_k$, but $U_1$, $U_2$, $V_1$ and $V_2$ reflect separate dependencies. Thus, Equation 12 becomes $$I_{NA}(x,y,t_k) = B_{NA} + U_1(x,y)U_2(t_k)f_c(x,y,t_k)\cos(t_k) + V_1(x,y) V_2(t_k)f_s(x,y,t_k)\sin(t_k). \tag{25}$$

The following additional identities are then defined to simplify Equation 25:

$$B_{NA}(x,y,t_k) \equiv B_1(x,y)B_2(t_k),$$

$$C(x,y,t_k) \equiv U_1(x,y)*f_c(x,y,t_k),$$

$$S(x,y,t_k) \equiv V_1(x,y)*f_s(x,y,t_k),$$

$$\text{Cos}[t_k(t_k)] \equiv U_2(t_k)\cos(t_k), \text{ and}$$

$$\text{Sin}[t_k(t_k)] \equiv V_2(t_k)\sin(t_k). \tag{26}$$

Thus, Equation 25 may be written as:

$$I(x,y,t_k) = B_1(x,y)B_2(t_k) + C(x,y,t_k)*\text{Cos}(t_k) + S(x,y,t_k)*\text{Sin}(t_k) \tag{27}$$

Note that the difference between Equation 27 and Equation 17 above (the prior-art equation with the same form) lies only in the implicit dependence of the "C" and "S" parameters on the "$t_k$" variable. That is, the two parameters, $C=C(x,y,t_k)$ [instead of $C=C(x,y)$] and $S=S(x,y,t_k)$ [instead of $S=S(x,y)$], are the items that distinguish the equation of the invention from the prior art. As mentioned before, this dependency is introduced to account for the wavelength bandwidth and the numerical aperture.

According to the invention, Equation 27 is used globally (i.e., over x,y and $t_k$) to find iteratively the best sets of parameters, steps sizes and phases that match the modulation data registered during the interferometric scan. To that end, an error function T' is defined, as in the prior art, on the basis of the difference between the recorded values of intensity and the values predicted by Equation 27. Using again a least-squares approach, the error function T' may be written as:

$$T'(x, y, t_k) \equiv \sum_x \sum_y \sum_k [I(x, y, t_k) - B_1(x, y)B_2(t_k) - C(x, y, t_k)*\text{Cos}(t_k) - S(x, y, t_k)*\text{Sin}(t_k)]^2. \tag{28}$$

The set of coordinates [$B_1$, C, S] and [$B_2$, Cos($t_k$), Sin($t_k$)] that minimize the error function T' is determined iteratively, as in the prior-art procedure, but with the novel steps outlined below. A description of the iterative process follows.

Step A. Using a guess solution for [$B_2^o$, Cos($t_k^o$), Sin($t_k^o$)], the best set [$B_1^i$, $C^i$, $S^i$] that minimizes the error function T' is found (wherein "i" is used again to denote iteration number). This is also preferably done in conventional manner by solving the partial derivative equations $$\frac{\partial T'}{\partial B_1} = \frac{\partial T'}{\partial C} = \frac{\partial T'}{\partial S} = 0. \tag{29}$$

Step B. At this point of the iteration, the goal is to determine $[B_2^i, \cos(t_k^i), \sin(t_k^i)]$ based on $[B_1^i, C^i, \text{and } S^i]$ and $[B_2^{i-1}, \cos(t_k^{i-1}), \sin(t_k^{i-1})]$, which are known. To that end, it is desirable to decouple the x,y dependence of C and S from their $t_k$ dependence (i.e., their planar position from the scanning height). This can be achieved by expressing Equation 27 in the form $$I(x,y,t_k) = B_1^i(x,y)B_2^i(t_k) + C_1^i(x,y)*\cos(t_k^i) + S_1^i(x,y)*\sin(t_k^i), \tag{27'}$$

where $C_1^i$ and $S_1^i$ are new values that for each pixel depend only on phase, $\phi$, and do not depend upon scanning position, $t_k$. To achieve this objective, according to another aspect of the present invention, the set of parameters $[C^i, S^i]$ produced at each iteration is assumed to be a linear combination of the actual $\cos(\phi)$ and $\sin(\phi)$ values multiplied by some arbitrary coefficients. Thus, each set of parameters $[C^i, S^i]$ produced by the step is expressed in terms of a new set $[C_1^i, S_1^i]$, as follows:

$$C^i = aC_1^i + bS_1^i \tag{30a}$$

$$S^i = aS_1^i - bC_1^i, \tag{30b}$$

wherein $C_1^i$ ad $S_1^i$ are terms that reflect the combined dependence of C and S on both sine and cosine of phase [i.e., $C^i \sim a*\sin(\phi) + b*\cos(\phi)$ and $S^i \sim a*\sin(\phi) - b*\cos(\phi)$]. Note the U and V dependence of C and S (from Equations 26 and 24 above), the $Q_{NA}$ and $P_{NA}$ dependence of U and V (from Equations 23), and the $\sin(\phi)$ and $\cos(\phi)$ dependence of $Q_{NA}$ and $P_{NA}$ (developed for the theoretical intensity generated by a narrow-band source of wavelength centered around $\lambda_0$—see Equations 11). Therefore, the assumption that $[C^i, S^i]$ may be expressed as a linear combination of the actual $\cos(\phi)$ and $\sin(\phi)$ values multiplied by some arbitrary coefficients is well founded in the derivation of the equations used to practice the invention. Thus, while $\phi = \arctan[S/C]$ would produce an approximate value of phase, a more precise value is expected to result from solving the implicit equation $$\phi = \arctan[S_1/C_1] \tag{31}$$

Inverting Equations 30 yields the following expressions for $C_1^i$ and $S_1^i$ as functions of a and b:

$$\begin{cases} C_1^i = \dfrac{aC^i - bS^i}{a^2 + b^2} \\ S_1^i = \dfrac{aS^i + bC^i}{a^2 + b^2} \end{cases} \tag{32}$$

Replacing these relations for $C_1^i$ and $S_1^i$ in Equation 27' yields $$I(x, y, t_k) = \tag{33}$$

$$B_1^i(x, y)B_2^{i-1}(t_k) + \frac{aC^i - bS^i}{a^2 + b^2}*\cos(t_k^{i-1}) + \frac{aS^i + bC^i}{a^2 + b^2}*\sin(t_k^{i-1})$$

where a and b are the only unknown values. All the other parameters are known. In order to simplify the iterative solution for a and b, noting that $C_1$ and $S_1$ are assumed proportional to cosine and sine functions, respectively, and that $\sin^2 + \cos^2 = 1$, the following condition is imposed:

$$(C_1^i)^2 + (S_1^i)^2 = A^2 = \text{const.} \tag{34}$$

Squaring both sides of Equations 30 and summing them yields $$[S^i]^2 + [C^i]^2 = a^2([S_1^i]^2 + [C_1^i]^2) + b^2([S_1^i]^2 + [C_1^i]^2). \tag{35}$$

Combining Equations 34 and 35 produces $$[S^i]^2 + [C^i]^2 = (a^2 + b^2)A^2, \tag{36}$$

that is, $$a^2 + b^2 = \frac{[S^i]^2 + [C^i]^2}{A^2}. \tag{37}$$

Replacing Equation 37 in Equation 33 produces the following relation:

$$I(x, y, t_k) = B_1^i(x, y)B_2^{i-1}(t_k) + \frac{A^2}{[S^i]^2 + [C^i]^2}(aC^i - bS^i)*\cos(t_k^{i-1}) + \tag{38}$$

$$\frac{A^2}{[S^i]^2 + [C^i]^2}(aS^i + bC^i)*\sin(t_k^{i-1}) =$$

$$B_1^i(x, y)B_2^{i-1}(t_k) + \frac{aA^2}{[S^i]^2 + [C^i]^2}\left(C^i - \frac{b}{a}S^i\right)*\cos(t_k^{i-1}) +$$

$$\frac{aA^2}{[S^i]^2 + [C^i]^2}\left(S^i + \frac{b}{a}C^i\right)*\sin(t_k^{i-1})$$

By defining the quantity $t = b/a$ and substituting it in Equation 38, one obtains $$I(x, y, t_k) = B_1^i(x, y)B_2^{i-1}(t_k) + \frac{aA^2}{[S^i]^2 + [C^i]^2}(C^i - tS^i)*\cos(t_k^{i-1}) + \tag{39}$$

$$\frac{aA^2}{[S^i]^2 + [C^i]^2}(S^i + tC^i)*\sin(t_k^{i-1}),$$

with the two new variables "$aA^2$" and "t." Forming a new error function T" on the basis of Equation 39 yields $$T''(x, y, t_k) \equiv \tag{40}$$

$$\sum_x \sum_y \sum_k \left[ I(x, y, t_k) - B_1^i(x, y)B_2^{i-1}(t_k) - \frac{aA^2}{[S^i]^2 + [C^i]^2}(C^i - tS^i)*\cos(t_k^{i-1}) - \frac{aA^2}{[S^i]^2 + [C^i]^2}(S^i + tC^i)*\sin(t_k^{i-1}) \right]^2.$$

Equation 40 can then be used explicitly to solve for "$aA^2$" and "t", by imposing the usual conditions:

$$\frac{\partial T''}{\partial (aA^2)} = \frac{\partial T''}{\partial t} = 0, \quad (41)$$

which provide two equations with two unknowns. Once the quantities $aA^2$ and t are so determined for the $i^{th}$ iteration, they are plugged back into Equation 40 to continue the iterative process.

Step C. Using the values so determined for $(aA^2)^i$ and $t^i$, the error function T" is updated. Then, a new set $[B_2^i, Cos(t_k)^i, Sin(t_k)^i]$ that minimizes the updated error function is determined, again by solving the derivative equations:

$$\frac{\partial T''}{\partial B_2} = \frac{\partial T''}{\partial Cos t_k} = \frac{\partial T''}{\partial Sin t_k} = 0. \quad (42)$$

Step D. Next, the step size $t_k^i$ (the frame separation during the scan) is estimated from the relation $$t_k^i = \arctan\left(\frac{Sin(t_k)^i}{Cos(t_k)^i}\right), \quad (43)$$

and $t_k^i$ is compared to the value obtained in the previous step. If the difference is less than a predetermined limit, the iteration process is stopped. Otherwise, the process is repeated from step A.

Step E. When the iterative process is concluded, the phase (and correspondingly the height) is calculated for each pixel x,y using the equation $$\varphi = \arctan\left(\frac{S^i}{C^i}\right), \quad (44)$$

where i corresponds to the last step of iteration.

Figure 3:
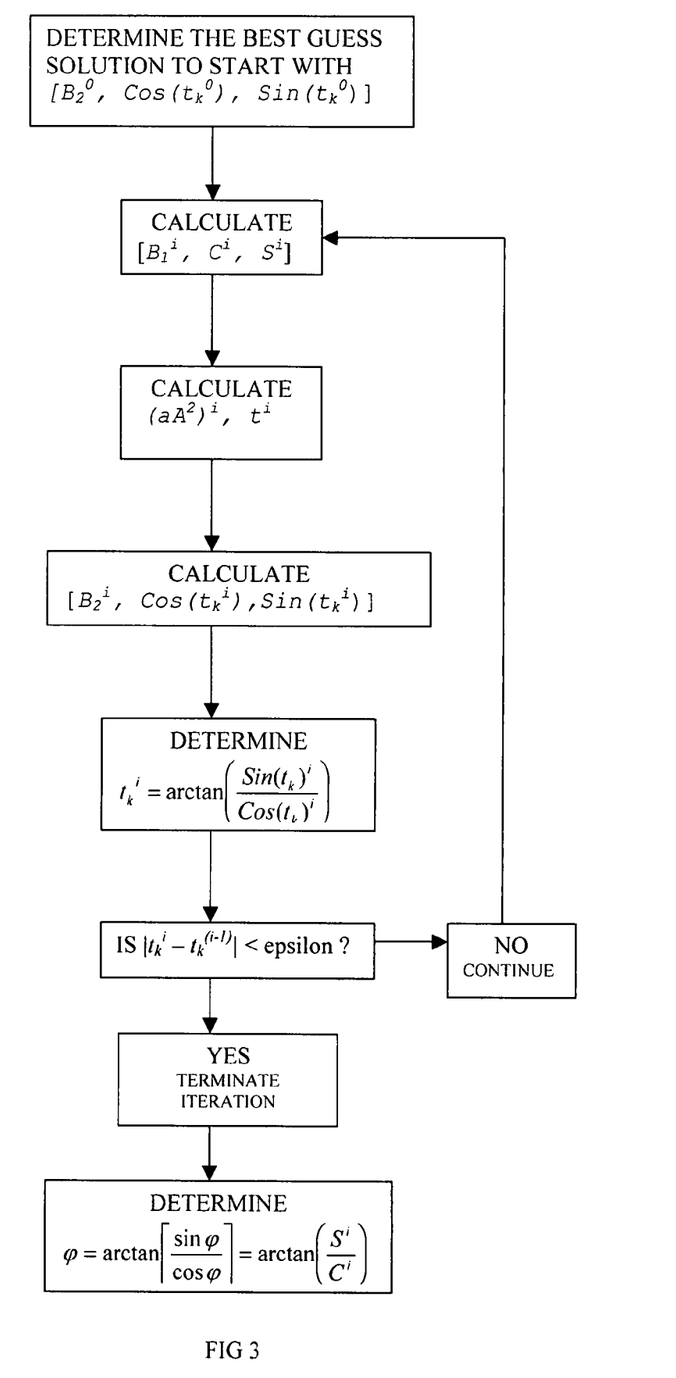
FIG. 3 is block diagram of the broad steps involved in carrying out the invention.

One skilled in the art will recognize that the novelty of the invention lies in step B, which is an additional step within the standard iterative algorithm. In essence, it involves the addition of parameters that account for wavelength and numerical-aperture dependencies in the equations used to express the theoretical intensity measured during an interferometric measurement. These parameters yield a "phase correction" for bandwidth and numerical aperture that was not previously achieved in the art. In addition, the step involves a phase-dependent parameter substitution that permits the rational decoupling of the dependence of C and S from the planar coordinates (x,y) and the scanning height coordinate ($t_k$). These new phase-dependent parameters in the equations simplify the numerical process and make it possible to refine the phase correction to a level significantly better than previously possible using conventional iterative techniques. FIG. 3 is a block diagram of the general procedure of the invention.

Figure 4A:
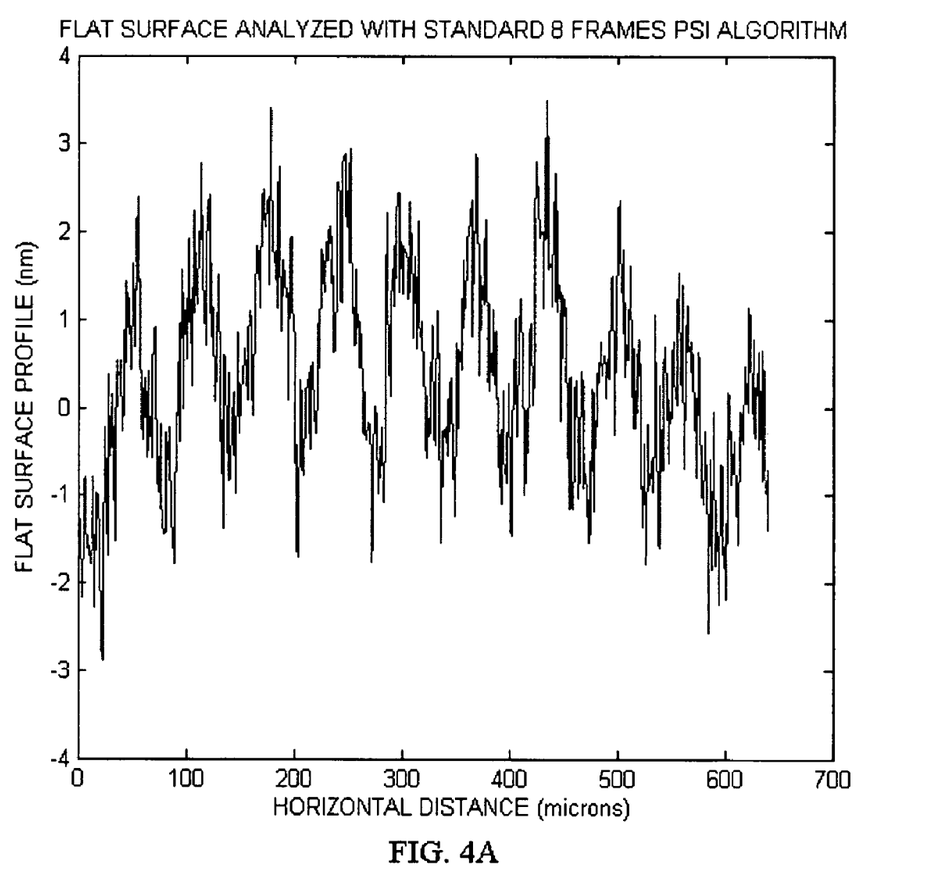
FIG. 4A is the profile of a flat surface obtained with 20-nm bandwidth illumination, a 0.13 NA, and a conventional eight-frame PSI algorithm.
Figure 4B:
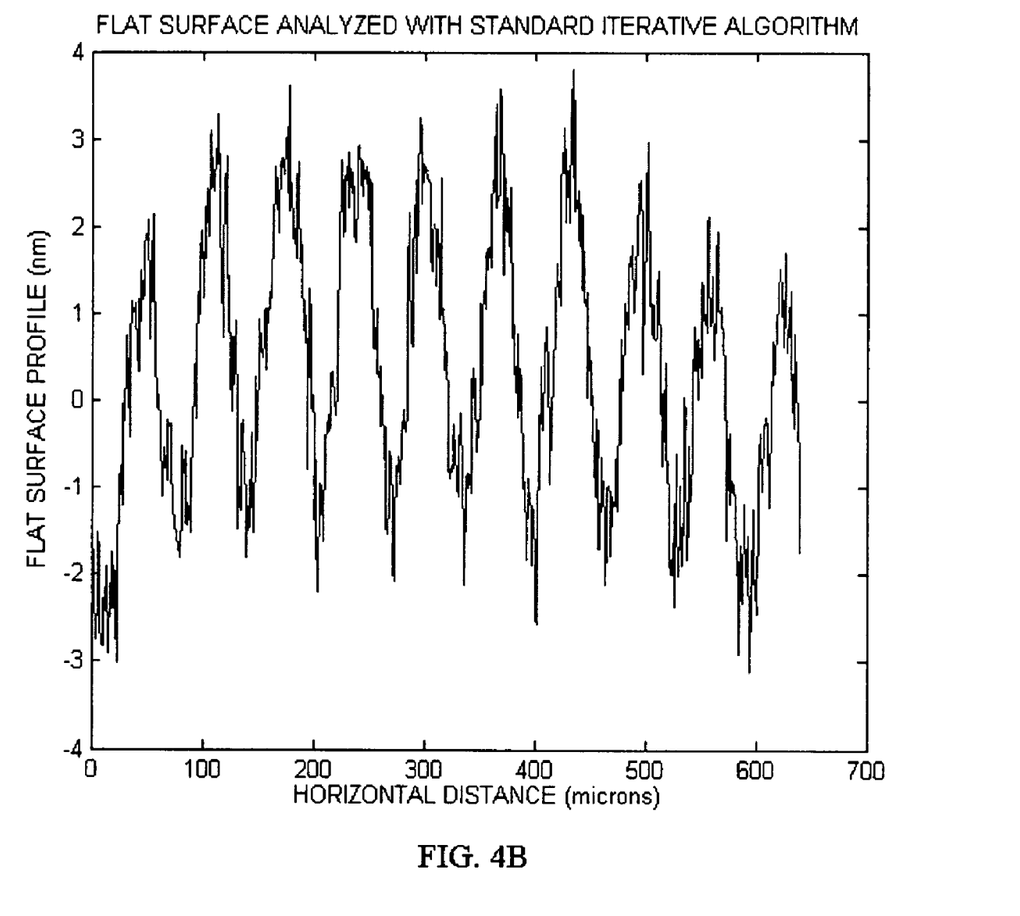
FIG. 4B is the profile of the flat surface of FIG. 4A obtained with a conventional iterative algorithm.
Figure 4C:
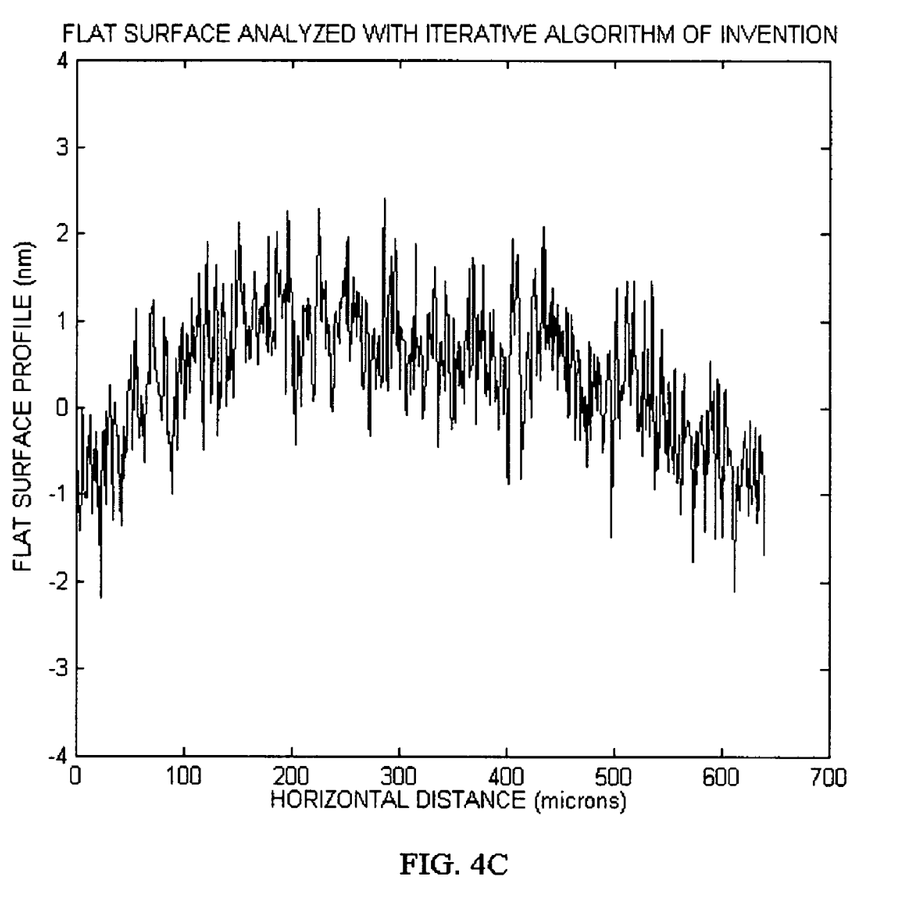
FIG. 4C is the profile of the flat surface of FIG. 4A obtained, according to the invention, with an algorithm including correction for modulation variations produced by numerical aperture and narrowband wavelength effects, in addition to scan nonlinearities and environmental factors.

FIGS. 4A, 4B and 4C illustrate the corrective power of the algorithm of the invention compared to conventional algorithms. FIG. 4A shows a sample profile produced by a typical eight-frame PSI algorithm using a 20-nm bandwidth illumination with 0.13 numerical aperture in a noisy environment. FIG. 5B shows a profile of the same sample under the same conditions produced with a prior-art iterative algorithm. (The algorithm disclosed by Okada et al., supra, was used as an exemplary conventional iterative algorithm.) FIG. 4C is a profile of the same surface obtained again under the same conditions, but using the iterative algorithm of the invention that also includes correction for modulation variations caused by relatively large numerical aperture and by narrowband wavelength. All figures reflect data taken with the same optical system and under the same sampling and environmental conditions. The correction algorithm offers a substantial reduction in noise by accounting for the effects of bandwidth and numerical aperture as well as vibrations and other environmental factors.

According to another aspect of the invention, the process may be simplified by normalizing $C_1^i$ and $S_1^i$ as follows:

$$C_1^i = \frac{C^i}{[C^i]^2 + [S^i]^2}, \quad (45a)$$

$$S_1^i = \frac{S^i}{[C^i]^2 + [S^i]^2}, \text{ and} \quad (45b)$$

and substituting these relations in the error function T" (Equation 40). In so doing, the error function T" becomes expressed in terms of $C_1^i$ and $S_1^i$ and can be used to perform all relevant steps of the iterative process (that is, $C_1^i$ and $S_1^i$ are calculated at each iteration using T" instead of $C^i$ and $S^i$ using T').

Note that this normalization flows naturally from the following observations. From the relation of the coefficients a and b defined above for Equation 39 and their relation to sine and cosine, which is similar to the relation of the parameters Q and P (see Equations 7 above), the following condition can be assumed:

$$\frac{b}{a} \approx \frac{P}{Q} \cong \frac{M^{eff} - N^{eff}}{M^{eff} + N^{eff}} \frac{\cos[h_m(\varphi - t_k)] - 1}{\sin[h_m(\varphi - t_k)]} \equiv t, \quad (46)$$

where t is constant and in practice is a very small number on account of the good symmetry of the light used in interferometry (i.e., $M^{eff} - N^{eff} = 0$). Furthermore, solving the system of Equations 30a and 30b produces the following identities:

$$S_1^i = \frac{aS^i + bC^i}{a^2 + b^2} = \quad (47)$$

$$\frac{A^2}{[S^i]^2 + [C^i]^2}(aS^i + bC^i) = \frac{aA^2}{[S^i]^2 + [C^i]^2}\left(S^i + \frac{b}{a}C^i\right), \text{ and } C_1^i =$$

$$\frac{aC^i - bS^i}{a^2 + b^2} = \frac{A^2}{[S^i]^2 + [C^i]^2}(aC^i - bS^i) = \frac{aA^2}{[S^i]^2 + [C^i]^2}\left(C^i - \frac{b}{a}S^i\right).$$

If the ratio b/a is very small, as mentioned, and $aA^2$ is a fixed number (being by definition the product of two constants), the set of Equations 47 can be written as $$C_1^i \approx \frac{C^i}{[C^i]^2 + [S^i]^2} \quad (48a)$$

$$S_1^i \approx \frac{S^i}{[C^i]^2 + [S^i]^2}, \quad (48b)$$

which explains the appropriateness of the normalization given above.

While the procedure of the invention given above is general, it is preferably carried out under conditions most suitable to conform to the assumptions underlying it derivation. In particular, the following data collection conditions are recommended:

1. The data are taken symmetrically around best focus (i.e., the interferometer's objective is at focus in the center of the image at the middle frame of the vertical scan).
2. A narrow bandpass filter (+/−20 nm) is used, such that $$h_M \equiv \frac{\lambda_M}{\lambda_0} = \frac{20}{700} = 0.03.$$

3. The PSI measurement is done with 3-12 frames separated by $$\frac{\pi}{2} (|t_k| \leq 1.5\pi).$$

4. The number of fringes in the field of view is about 5 ($|\phi| \leq 5\pi$).

Under these working parameters, the following condition can be expected to be true $$|h_M(\phi - t_k)| \leq 0.03*(5+1.5)*\pi \approx 0.2*\pi \tag{49}$$

Referring back to Equation 6, a substitution of the following Taylor expansions, $$\sin[h_M(\varphi - t_k)] \cong h_M(\varphi - t_k) - \frac{[h_M(\varphi - t_k)]^3}{6} \text{ and} \tag{50}$$

$$\cos[h_M(\varphi - t_k)] \cong 1 - \frac{[h_M(\varphi - t_k)]^2}{2},$$

yields the following equation for the recorded interferometric signal:

$$I(x, y, t_k, \lambda_0) = B + (N^{\text{eff}} - M^{\text{eff}}) \frac{[h_M(\varphi - t_k)]}{2} \sin(\varphi - t_k) + \tag{51}$$

$$(M^{\text{eff}} + N^{\text{eff}}) \left[1 - \frac{[h_M(\varphi - t_k)]^2}{6}\right] \cos(\varphi - t_k).$$

Defining now new quantities "P" and "Q" such that:

$$P \equiv (N^{\text{eff}} - M^{\text{eff}}) \frac{[h_M(\varphi - t_k)]}{2}, \text{ and} \tag{52}$$

$$Q \equiv (M^{\text{eff}} + N^{\text{eff}}) \left[1 - \frac{[h_M(\varphi - t_k)]^2}{6}\right],$$

the signal intensity of Equation 51 becomes:

$$I(x,y,t_k,\lambda_0) = B + P*\sin(\phi - t_k) + Q*\cos(\phi - t_k). \tag{53}$$

Expanding the "sin" and "cos" terms in Equation 53 produces the following:

$$I(x, y, t_k, \lambda_0) = \tag{54}$$

$$B + Q\left[\cos(\varphi) + \frac{P}{Q}\sin(\varphi)\right]\cos(t_k) + Q\left[\sin(\varphi) - \frac{P}{Q}\cos(\varphi)\right]\sin(t_k),$$

where $B = B(x,y,t_k,\lambda_0),$ $Q = Q(x,y,t_k,\lambda_0),$ $P = P(x,y,t_k,\lambda_0),$ $\phi = \phi(x,y).$ Defining $$R \equiv \frac{P}{Q} = \frac{M^{\text{eff}} - N^{\text{eff}}}{M^{\text{eff}} + N^{\text{eff}}} * \frac{\cos[h_M(\varphi - t_k)] - 1}{\sin[h_M(\varphi - t_k)]} \cong \tag{55}$$

$$\frac{M^{\text{eff}} - N^{\text{eff}}}{M^{\text{eff}} + N^{\text{eff}}} * \frac{\frac{[h_M(\varphi - t_k)]}{2}}{1 - \frac{[h_M(\varphi - t_k)]^2}{6}},$$

for the case when $|h_M(\phi - t_k)| \leq 0.2*\pi$, as described above with reference to the preferred conditions to practice the invention, it follows that $$\left|\frac{M^{\text{eff}} - N^{\text{eff}}}{M^{\text{eff}} + N^{\text{eff}}}\right| * \frac{0.1*\pi}{1 - \frac{0.04*\pi^2}{6}} \cong 0.34 * \left|\frac{M^{\text{eff}} - N^{\text{eff}}}{M^{\text{eff}} + N^{\text{eff}}}\right|. \tag{56}$$

For the case of and asymmetry $$\left|\frac{M^{\text{eff}} - N^{\text{eff}}}{M^{\text{eff}} + N^{\text{eff}}}\right| \cong 5\% = 0.05,$$

the following hold true:

$$0 \leq |R| \leq 1.7\%, \tag{57}$$

which justifies the assumption made above in deriving Equation 39 that b/a is small.

Thus, a novel iterative procedure has been described that advantageously allows correction for modulation variations produced by bandwidth and numerical-aperture conditions normally encountered in practice. The method has been particularly effective for the measurement of optically smooth, flat surfaces with steps. For example, magnetic heads used in data storage, electronic substrates in semiconductor components, plastic electronics components, solar energy conversion devices, micro-mirror arrays and micro-electro-mechanical systems (MEMS) devices are all characterized by such smooth, flat surfaces with steps. As FIGS. 4A-4C illustrate, the invention enables a measurement with significantly improved precision over prior-art iterative algorithms.

It is clear from the derivation of the equation and procedure of the invention that partial benefits may be achieved by utilizing an equation that includes a parameter that depends only on bandwidth or only on numerical aperture. That is, the iterative procedure may be carried out with respect to a single novel parameter and yet produce improved results over the prior art. Therefore, such more limited application of the concept described herein is intended to be part of the invention covered herein.

While the invention has been shown and described herein in what is believed to be the most practical and preferred embodiments, it is recognized that departures can be made therefrom within the scope of the invention. For example, the invention has been described with reference to interferometric microscope applications, but it is clearly applicable as well to other methods that use fringes for analysis (that is, analysis most commonly based on PSI methods). These include, without limitation, digital holography methods that use phase-shifted holograms, wavelength scanning and spectrally resolved white light interferometric systems, speckle systems, fringe projection methods (in which fringes may be created in many different ways, such as by projecting fringes from an interferometer, a ronchi grating, a digital signal projector, or an OLED device). In essence, the invention can be used advantageously whenever PSI methods are used for phase calculations if vibrations and modulation variations are present. Therefore, the invention is not to be limited to the details disclosed herein but is to be accorded the full scope of the claims so as to embrace any and all equivalent processes and products.

We claim:

1. A method of reducing errors in measurements performed with an interference microscope, the method comprising the following steps:
    employing an equation expressing intensity as a function of planar coordinates, optical path difference, phase, and a set of equation parameters reflecting an implicit dependence on illumination spectral bandwidth and numerical aperture, said equation parameters having an explicit dependence on planar coordinates, optical path difference and phase;
    replacing said equation parameters with new phase-dependent parameters such that said explicit dependence of the equation parameters on planar coordinates is decoupled from the dependence on optical path difference;
    fitting said equation to global interference data acquired by varying said optical path difference, thereby producing an optimal set of said equation parameters, said fitting step being an iterative process wherein said equation parameters are estimated to a predetermined iterative threshold of convergence; and
    calculating a modified phase value using said optimal set of equation parameters.

2. The method of claim 1, further including the step of calculating a height map of a sample based on said modified phase.

3. The method of claim 1, wherein the calculating step attenuates an impact of noise in the measurements due to mechanical vibrations present at the interference microscope.

4. The method of claim 2, wherein the calculating step attenuates an impact of noise in the height map due to mechanical vibrations present at the interference microscope.

5. The method of claim 1, wherein said interference data acquired by varying the optical path difference are taken symmetrically around a best focus position.

6. The method of claim 1, wherein said interference data acquired by varying the optical path difference are produced using a light source including a bandpass filter of approximately 20-nm bandwidth.

7. The method of claim 1 wherein said interference data are acquired over three to twelve frames separated by a nominal phase step of $$\frac{\pi}{2}.$$

8. The method of claim 1, wherein said interference microscope is operated so as to produce about five fringes within a field of view of an objective of the microscope.

9. The method of claim 1, wherein said step of varying the optical path difference is carried out with a vertical scan.

10. The method of claim 1, wherein the method is used to measure a magnetic read-write head for data storage.

11. The method of claim 1, wherein the method is used to measure an electronic substrate in a semiconductor component.

12. The method of claim 1, wherein the method is used to measure a plastic electronics component.

13. The method of claim 1, wherein the method is used to measure a solar energy conversion device.

14. The method of claim 1, wherein the method is used to measure a micro-mirror array.

15. The method of claim 1, wherein the method is used to measure a MEMS device.

16. An interferometric iterative procedure comprising:
    selecting an equation expressing intensity as a function of planar coordinates, optical path difference, phase, and a set of bandwidth-dependent and numerical-aperture-dependent equation parameters, said equation parameters having an explicit dependence on planar coordinates, optical path difference and phase;
    replacing said equation parameters with new phase-dependent parameters such that said explicit dependence of the equation parameters on planar coordinates is decoupled from the dependence on optical path difference;
    fitting said equation to global interference data acquired by varying said optical path difference, thereby producing an optimal set of said equation parameters; and
    using said optimal set of equation parameters to calculate a corrected phase.

17. The method of claim 16, wherein said fitting step includes establishing an error function based on said equation and minimizing the error function with respect to said set of equation parameters over the global interference data, thereby producing the optimal set of equation parameters.

18. The method of claim 17, wherein the step of minimizing the error function involves:
    (a) performing a first sub-step of minimizing the error function with respect to a first subset of said new phase-dependent parameters;
    (b) producing an updated error function with a first sub-set of the new-phase-dependent parameters that minimized the error function during said first sub-step;
    (c) performing a second sub-step of minimizing the updated error function with respect to a second subset of said new phase-dependent parameters;
    (d) producing a further updated error function with a second sub-set of the new phase-dependent parameters that minimized the error function during said second sub-step; and
    (e) iteratively repeating steps (a) through (d) until a predetermined iterative condition is met.

19. The method of claim 18, further including the step of calculating a height map of a sample based on said corrected phase.

20. The method of claim 17, wherein said error function is a least-squares representation of a difference between actual intensities produced by an interferometric system and theoretical intensities predicted by said equation expressing intensity as a function of planar coordinates, optical path difference, phase, and said set of bandwidth-dependent and numerical-aperture-dependent equation parameters.

21. The method of claim 16, further including the step of calculating a height map of a sample based on said corrected phase.

22. The method of claim 16, wherein said interference data acquired by varying the optical path difference are taken symmetrically around a best focus position.

23. The method of claim 16, wherein said interference data acquired by varying the optical path difference are produced using a light source including a bandpass filter of approximately 20-nm bandwidth.

24. The method of claim 16, wherein said interference data are acquired over three to twelve frames separated by a nominal phase step of $$\frac{\pi}{2}.$$

25. The method of claim 16, wherein said interference data are acquired in a system producing about five fringes within a field of view of an objective of the system.

26. The method of claim 16, wherein said step of varying the optical path difference is carried out with a vertical scan.

27. The method of claim 16, wherein said interference data acquired by varying the optical path difference are taken symmetrically around a best focus position using a light source of approximately 20-nm bandwidth, and the interference data are acquired over three to twelve frames separated by a nominal phase step of $$\frac{\pi}{2}.$$

28. An interferometric method of profiling a sample surface comprising the following steps:
    performing an interferometric measurement of the surface, thereby producing a corresponding set of interferometric data;
    establishing an error function based on an equation expressing intensity as a function of planar coordinates, optical path difference, phase, and a set of bandwidth-dependent equation parameters, said equation parameters having an explicit dependence on planar coordinates, optical path difference and phase;
    replacing said equation parameters with new phase-dependent parameters such that said explicit dependence of the equation parameters on planar coordinates is decoupled from the dependence on optical path difference;
    minimizing said error function with respect to said equation parameters over the set of interferometric data, thereby producing an optimal set of equation parameters; and
    using said optimal set of equation parameters to calculate a corrected phase.

29. The method of claim 28, wherein said error function is a least-squares representation of a difference between actual intensities produced by said interferometric measurement and theoretical intensities predicted by said equation expressing intensity as a function of planar coordinates, optical path difference, phase, and said set of bandwidth-dependent equation parameters.

30. The method of claim 28, further including the step of calculating a height map of the sample based on said corrected phase.

31. The method of claim 28, wherein:
    said error function is a least-squares representation of a difference between actual intensities produced by said interferometric measurement and theoretical intensities predicted by said equation; and
    said interferometric measurement is carried out by varying said optical path difference with a vertical scan with data-acquisition frames separated by a nominal phase step of $$\frac{\pi}{2}.$$

32. An interferometric method of profiling a sample surface comprising the following steps:
    performing an interferometric measurement of the surface, thereby producing a corresponding set of interferometric data;
    establishing an error function based on an equation expressing intensity as a function of planar coordinates, optical path difference, phase, and a set of numerical-aperture-dependent equation parameters, said equation parameters having an explicit dependence on planar coordinates, optical path difference and phase;
    replacing said equation parameters with new phase-dependent parameters such that said explicit dependence of the equation parameters on planar coordinates is decoupled from the dependence on optical path difference;
    minimizing said error function with respect to said equation parameters over said set of interferometric data, thereby producing an optimal set of equation parameters; and
    using said optimal set of equation parameters to calculate a corrected phase.

33. The method of claim 32, wherein said error function is a least-squares representation of a difference between actual intensities produced by said interferometric measurement and theoretical intensities predicted by said equation expressing intensity as a function of and said numerical-aperture-dependent parameter, planar coordinates, optical path difference, phase, and said set of numerical-aperture-dependent equation parameters.

34. The method of claim 32, further including the step of calculating a height map of the sample based on said corrected phase.

35. The method of claim 32, wherein:
    said error function is a least-squares representation of a difference between actual intensities produced by said interferometric measurement and theoretical intensities predicted by said equation; and
    said interferometric measurement is carried out by varying said optical path difference with a vertical scan with data-acquisition frames separated by a nominal phase step of $$\frac{\pi}{2}.$$

36. A method of correcting effects of modulation variations caused by illumination bandwidth and numerical aperture in an interferometric system, the method comprising the following steps:

developing an equation expressing intensity as a function of planar coordinates, scanner position, phase, and a set of bandwidth-dependent and numerical-aperture-dependent equation parameters, said equation parameters having an explicit dependence on planar coordinates, scanner position and phase;

replacing said equation parameters with new phase-dependent parameters such that said explicit dependence of the equation parameters on planar coordinates is decoupled from the dependence on scanner position;

establishing an error function as a least-squares representation of a difference between actual intensities produced by said interferometric system and theoretical intensities predicted by said equation;

minimizing said error function with respect to said set of equation parameters over global interference data acquired through an interferometric scan, said minimizing step including:

(a) performing a first sub-step of minimizing the error function with respect to a first subset of said new phase-dependent parameters;

(b) producing an updated error function with a first subset of the new-phase-dependent parameters that minimized the error function during said first sub-step;

(c) performing a second sub-step of minimizing the updated error function with respect to a second subset of said new phase-dependent parameters;

(d) producing a further updated error function with a second sub-set of the new phase-dependent parameters that minimized the error function during said second sub-step; and (e) iteratively repeating steps (a) through (d) until a predetermined iterative condition is met;

thereby producing an optimal set of said equation parameters;

using said optimal set of equation parameters to calculate a corrected phase; and calculating a height map of a sample based on said corrected phase.

* * * * *